UNITED STATES PATENT OFFICE.

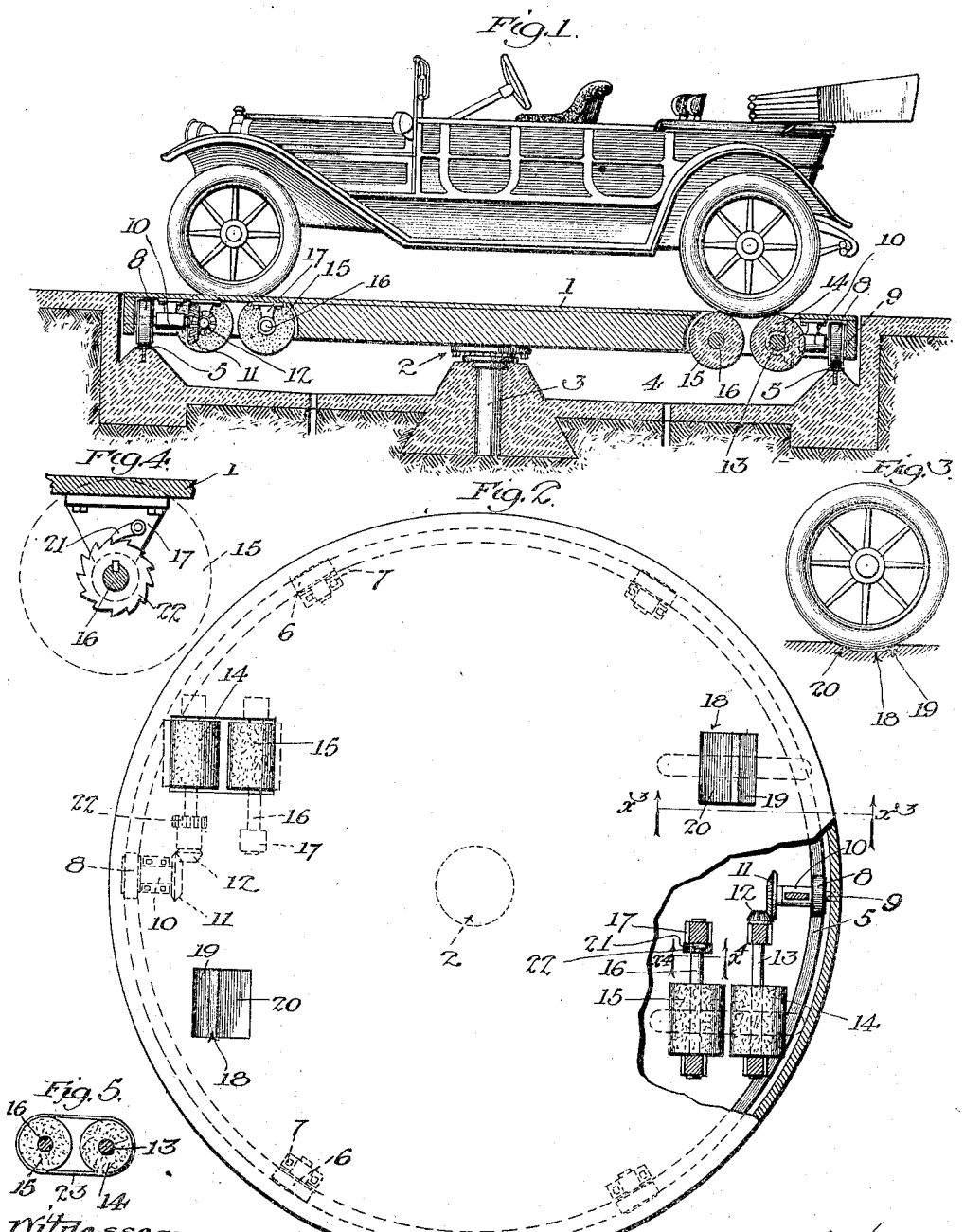

ALBERT DELLAMORE, OF LOS ANGELES, CALIFORNIA.

AUTOMOBILE TURN-TABLE.

1,038,309. Specification of Letters Patent. Patented Sept. 10, 1912.

Application filed April 16, 1912. Serial No. 691,246.

*To all whom it may concern:*

Be it known that I, ALBERT DELLAMORE, a citizen of the United States, residing at Los Angeles, in the county of Los Angeles and State of California, have invented a new and useful Automobile Turn-Table, of which the following is a specification.

This invention relates to automobile turn-tables and the main object of the invention is to provide a turntable which is operated by the revolution of the driving wheels of the automobile while the automobile is resting on the turntable.

Referring to the drawings: Figure 1 is a vertical diametric section through the turntable, showing an automobile in position thereon. Fig. 2 is a plan view of the turntable partly in section. Fig. 3 is a section on line $x^3-x^3$ Fig. 2. Fig. 4 is a section on line $x^4-x^4$ Fig. 2. Fig. 5 is a modified form of the traction wheels.

1 designates the table which is partly supported at the center by a thrust bearing 2 on a pedestal 3. The pedestal 3 is located in the center of a pit 4 and around the edge of the pit is a raised track 5. Wheels 6 are mounted in suitable journals 7 under the table 1 and support the table revolubly, enabling it to be easily revolved. Two driving rollers 8 also rest on the track 5, each roller 8 being mounted on a shaft 9 journaled in bearings 10 and carrying a beveled gear 11 which meshes with a beveled pinion 12 on a shaft 13. Mounted on the shaft 13 is a friction roll 14 and arranged next to the roll 14 is a similar friction roll 15 which is mounted on a shaft 16, the latter being idly journaled in bearings 17. The friction rolls 14 are preferably formed of concrete to give a good friction with the tires of the automobile, and permitting them to be easily washed to remove mud which may collect. The table 1 is also formed with two wheel depressions 18, each depression 18 having an abrupt incline 19 and a gradual incline 20, and is located in line with the space between the adjacent friction rollers 14 and 15, and so spaced that one wheel of the automobile may rest on the rollers 14 and 15 and the opposite wheel rest in the depression 18. Pivoted to the journal 17 is a pawl 21 which engages a ratchet 22 on the shaft 16 which permits the roller 15 to turn in one direction only.

In operation, the automobile is run onto the turntable and so placed that one of its driving wheels rests on friction rollers 14 and 15, while the other driving wheel rests in the adjacent wheel depression 18. The front wheels of the automobile may or may not rest on the opposite friction rollers or wheel depression, depending on the length of the automobile and this is immaterial because the opposite set are provided as duplicates in order that there may be one set at the point of exit or entrance, and as the turntable will ordinarily only be turned one-half around, I locate them opposite each other. The automobile having been placed in position, the gears of the automobile are shifted so that the automobile would travel rearwardly, then by starting the driving wheels in motion, one of the wheels is retained in the wheel depression 18 and prevented from rotating and rolling backward out of the depression by the abrupt incline 19, and as the other driving wheel is free to turn, it operates to rotate the rollers 14 and 15, and as rollers 14 operate, the gears 11 and 12 transmit rotation to the wheel 8 and the latter rolling on the track 5, turns the turntable into the position desired, and when such position is reached, further revolution of the automobile wheel is stopped. The gear of the automobile is then shifted and the automobile is propelled forward and when thus propelled, the wheel which is in the depression 18, travels up the gradual incline 20 and the wheel which rests on the friction rollers travels over the roller 15 which is now held against rotation by the ratchet 22 and pawl 21, so that the automobile may be easily driven off the turntable.

If desired a belt 23 may be passed over the traction wheels 14 and 15, as shown in Fig. 5 for the automobile wheels to rest on instead of resting directly on the wheels 14 and 15.

What I claim is:

1. An automobile turntable, comprising a rotary table, a track, driving wheels on the track and journaled on the table, friction wheels journaled on the table for operating said driving wheels, means for preventing one of said friction wheels from rotating in one direction, and a wheel depression in the table for holding a driving wheel of the automobile.

2. An automobile turntable, comprising a rotary table, a track, driving wheels on the track and journaled on the table, friction wheels journaled on the table for operating said driving wheels, means for preventing one of said friction wheels from rotating in one direction, a wheel depression in the table for holding a driving wheel of the automobile, said wheel depression having an abrupt incline at one side and a gradual incline on the other side.

In testimony whereof, I have hereunto set my hand at Los Angeles, California, this 29th day of March, 1912.

ALBERT DELLAMORE.

In presence of—
G. T. HACKLEY,
MARTHA M. M. LANGE.